Nov. 11, 1969  G. I. McNEIL  3,477,767
SNOWMOBILE TRACK
Filed Dec. 19, 1967
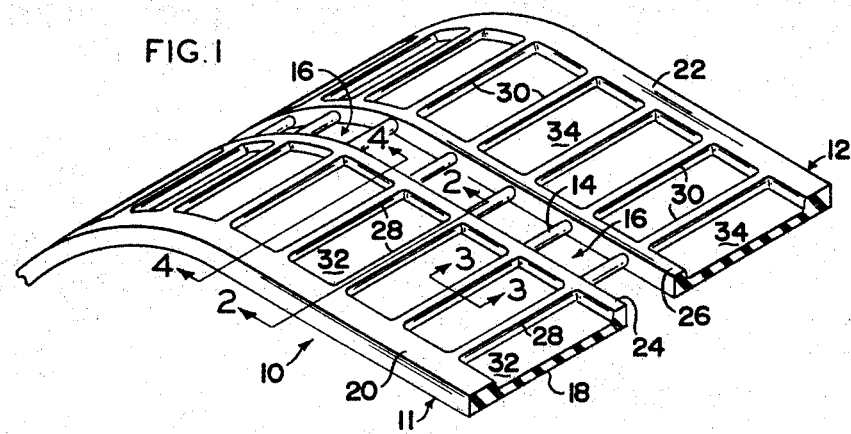
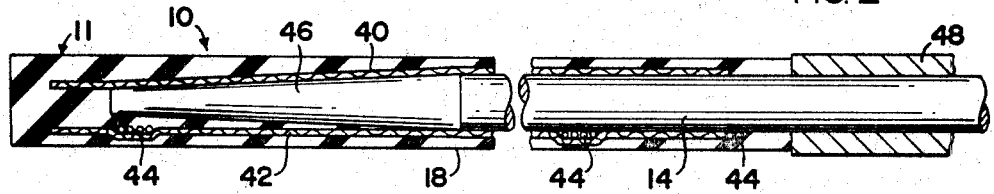
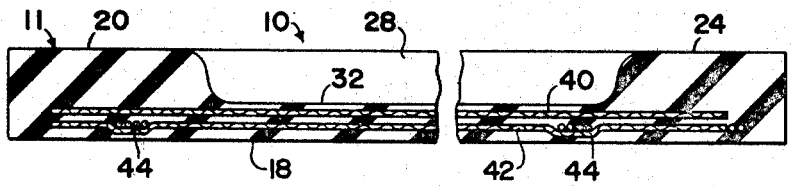
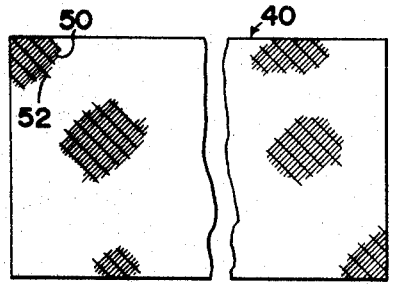
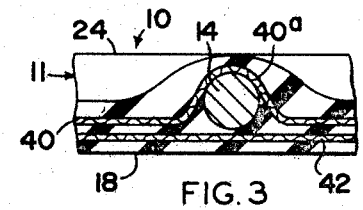
INVENTOR.
GORDON I. MCNEIL
BY
Meyer, Tilberry & Body
ATTORNEYS.

3,477,767
SNOWMOBILE TRACK
Gordon I. McNeil, 330 E. Perry St.,
Port Clinton, Ohio 43452
Filed Dec. 19, 1967, Ser. No. 691,797
Int. Cl. B61b 7/00
U.S. Cl. 305—38                                        7 Claims

ABSTRACT OF THE DISCLOSURE

An endless belt or track of flexible material with rigid cross bars extending transverse of the track and flexible cables and fabric extending longitudinally of the track.

---

This invention relates to endless tracks or belts and, more particularly, to a flexible track for motor driven vehicles or the like.

Although the invention will be disclosed in connection with a track for a motor driven vehicle, it is to be understood that the principles of the invention have broader application and may be employed wherever an endless belt or track is required.

Various types of pleasure or sport vehicles employing an endless belt or track as the motive means for the vehicle have appeared on the market recently. These vehicles are generally designed for travel over snowy terrain and have become known as snowmobiles. Typically, these vehicles employ an endless belt or track which engages the surface of the terrain over which the vehicle passes with the track being driven by any suitable source of motive power. The vehicles normally are designed for use on a wide variety of slopes and terrains and are sufficiently powered that they travel at a considerable rate of speed.

In view of the speed for which these vehicles are designed and the diversity of terrains over which the vehicle may pass, the construction of the track or belt employed in such vehicles is of considerable importance. There are several general considerations which must be taken into account in designing such a track. Thus, unlike large track driven vehicles such as tanks or the like in which a heavy construction of the track may be employed to obtain the necessary strength, it is generally desirable that the track for a snowmobile be as light in weight as possible, thereby to maintain the weight of the vehicle at a minimum. Moreover, the track for a snowmobile should be as flexible as possible thereby to minimize the power requirements necessary to drive the track and thus the vehicle. Yet the track must be strong enough to avoid punctures by objects such as rocks or the like over which the track may pass and the track must have sufficient stiffness and stability to avoid stretching under tension or being thrown from the drive sprockets as the vehicle passes over sloping surfaces.

It is the primary object of this invention to provide an improved endless track or belt which satisfies all of the above-mentioned considerations.

In accordance with one aspect of the invention, the track comprises a strip of flexible material such as rubber or the like with a plurality of apertures in the strip spaced along the longitudinal length thereof. Relatively rigid bar means are embedded in the strip and extend transversely of the strips between the apertures. Tension resisting cable means are embedded in the strip and extend longitudinally of the strip with the cable means being unconnected to the bar means.

In accordance with another aspect of the invention, the track employs first and second layers of fabric embedded in the strip with both layers being divided into a left hand portion and a right hand portion. One layer of the left hand portion is bias-cut to the right while the other layer of the left hand portion is bias-cut to the left. Similarly, one layer of the right hand portion is bias-cut to the left while the other layer of the right hand portion is bias-cut to the left, thereby, providing a balanced, straight running track with the bias-cut of the fabric enabling the track to envelope sharp objects such as stones without puncture.

Still another aspect of the invention is the relationship between the bias-cut fabric and the cross bars. The cross bars are enveloped by the fabric with the cords of the fabric and the strip material absorbing the shock of the sprocket drive as the sprocket teeth engage the cross bars thereby providing a cushioned drive for the belt.

It is an object of this invention to provide a belt or track which has improved flexibility and requires less power to drive the belt.

Another object of this invention is to provide a track having improved dimensional stability.

A further object of this invention is to provide a track having improved ability to engage sharp objects without punctures.

A still further object of the invention is the provision of an endless belt or track that cushions the drive force applied to the track.

Other objects and features of the invention will become more apparent to those having skill in the art upon a complete reading of the following description and attached drawings which disclose but a preferred embodiment of the invention.

Referring to the drawings wherein like reference numerals indicate like parts in the various views:

FIGURE 1 is a perspective view of a portion of a track or belt constructed in accordance with the principles of this invention.

FIGURE 2 is a sectional view along line 2—2 of FIGURE 1.

FIGURE 3 is a sectional view along line 3—3 of FIGURE 1.

FIGURE 4 is a sectional view along line 4—4 of FIGURE 1.

FIGURE 5 illustrates a portion of the fabric employed in the track.

Referring now to the drawings wherein the showings are for the purpose of illustrating a preferred embodiment of the invention only and not for the purpose of limiting the same, FIGURE 1 shows a section of an endless track or belt, indicated generally by the reference numeral 10, fabricated in accordance with the principles of this invention. The track 10 comprises a flexible strip of material such as rubber or the like. The belt 10 includes a left hand section 11 and a right hand section 12 with both sections being of substantially identical construction. The sections 11 and 12 are interconnected by cross bars 14 embedded in the rubber, as is more fully described hereinafter, with the cross bars 14 defining spaced apertures 16 in which appropriate teeth on a drive sprocket (not shown) may be received to provide the driving force for the track 10.

Each section 11 and 12 includes a flat surface 18 for engagement with the cylindrical surface on the driving sprocket. Each of the sections further includes on the upper surface thereof, thickened outer longitudinal edge portions or ridges 20, 22, respectively, and thickened inner longitudinal edge portions or ridges 24, 26 with transverse ribs 28, 30 extending between the edge portions 20, 24 and 22, 26 respectively. The ribs and edge portions of each section thus define a ground engaging surface with recesses 32, 34 providing means for the belt to grip loose materials such as snow or sand or the like.

Referring more particularly to FIGURES 2, 3, and 4, the specific construction of the belt or track will now be described. Each of the sections 11 and 12 are substantially identical in construction and together form a flexible strip with a row of apertures 16 formed therein. Each section of this strip is formed of a base material of rubber or other flexible material. Embedded in the base material of each section is one transverse end of the cross bars 14 along with an upper layer of fabric 40, a lower layer of fabric 42 and several wraps of cable 44. The ends of cross bar 14 are preferably of a tapered construction which terminates in a flattened portion 46 thereby to prevent the rotation of the cross bar in the rubber material. A bushing 48 is received over the exposed portion of the cross bar 14 between sections 11, 12 and is adapted to engage the teeth of the sprocket drive wheel. It will be appreciated that other forms and configurations of cross bars may be employed without departing from the spirit of the invention. The principal purpose of the cross bars is to provide a rigid surface against which the sprocket teeth engage as well as to provide lateral stability for the belt.

The layers of fabric 40, 42 are embedded in the base material and extend longitudinally of the belt. In this connection, it is important to note that the upper layer 40, as shown in FIGURE 3, lies in a plane generally spaced from the horizontal axis of the cross bars 14 but forms a loop 40a which comes up and over each of the cross bars thereby to engage and envelope each of the cross bars over a substantial portion of the periphery of the bar. This arrangement of the fabric and cross bars together with the base material in which they are embedded effectively couples the fabric to the bars. The lower layer of fabric 42 is spaced below the cross bars and does not engage either the cross bars or the upper layer of fabric.

Various types of fabric material might be employed in the construction of the belt; however, it is preferred that a nylon fabric similar to the nylon fabric employed in tire manufacture be used in the belt. In accordance with the preferred form of this invention, the nylon fabric is composed of monofilament nylon cords which may be considered to correspond to the conventional warp threads in a square woven fabric. However, these nylon warp threads 50 are arranged on the bias relative to the longitudinal axis of the belt, either by weaving the material in conventional manner and then cutting the material on the bias or in any other manner. The terms "bias fabric" or "bias-cut fabric" as used herein are intended merely to describe the construction of the fabric and are not intended to indicate the method by which it was constructed.

The warp threads 50 are held together by weft threads 52 which threads are employed merely to retain the relative positions of the warp threads 50 until such time as the fabric has been embedded in the rubber strip. Thereafter, the weft threads perform no substantial function. The warp threads 50 are desirably composed of nylon filaments since nylon does not absorb moisture; however, other types of materials may be employed without departing from the principles of this invention since it is the bias-cut of the fabric which performs the essential functions sought to be achieved.

To provide a straight running track with the bias-cut fabric layers 40, 42, it is contemplated that the warp threads 50 in layer 40 will, for example, be bias-cut to the right while the warp threads 50 in layer 42 will be bias-cut to the left. This arrangement is employed in both layers of both of the sections 11 and 12 of the belt so that a balanced construction is achieved and the track will run in a straight path. Preferably, the upper layers in sections 11, 12 would be bias-cut in opposite directions as would the lower layers as well. Thus, if upper layer 40 of section 11 was bias-cut to the right, the upper layer 40 of section 12 would be bias-cut to the left. Moreover, if a twisted fiber is employed as the warp threads in the fabric layers 40, 42 in lieu of monofilament cords, it is contemplated that the threads in one fabric layer would be balanced against the threads in the other layer. For example, the threads in one layer might be of a left hand twist while the threads in the other layer would be of a right hand twist so that the balanced construction of the track would be retained.

As pointed out heretofore, it is desirable to employ nylon fibers in the construction of the layers 40, 42 since nylon does resist absorption of moisture; however, the tendency of nylon to stretch under tension has discouraged the use of nylon in tracks such as these, particularly where the nylon would be subjected to tension. Accordingly, it is contemplated that the tensile force applied to the track will be withstood by a plurality of cables 44 embedded in the rubber base material. The cables 44 comprise wire rope of any suitable construction with the cables in one section 11 of the track being of a left hand twist while the cables in the other section 12 of the track being of a right hand twist. As shown, it is contemplated that four wraps of the cable 44 would be embedded in the rubber at either extremity of the cross bars 14 and also along the outer edge of the inner ridges 24, 26. Two wraps of the cable may be placed in the rubber immediately adjacent to the apertures 16. The free ends of the cables 44 are embedded in the rubber. It should be noted that the cables are thus available to withstand any tension imposed on the track 10 but the cables are wholly unconnected with the cross bars 14.

Several advantages of the above-described construction should be noted. Thus, the track employs but a single row of apertures 16 with a single pair of drive sprockets employed to drive the track. This is to be contrasted with most tracks designed for similar type vehicles in which, instead of a single center drive, two rows of spaced apertures and two pairs of sprockets drive the track thus, requiring more power.

The cross bars 14 are the only rigid elements in the entire track and provide the necessary lateral stiffness for the track but the bars do not in any way prevent the track from having desirable flexibility. This results from the fact that all of the elements in the track, including the cables 44 which are designed to withstand the tension applied to the track, are inherently flexible and are either wholly unconnected to the base bars 14 other than through the common base of rubber material, or are connected to the bars in a manner which in no way inhibits flexure. The flexibility of the track resulting from this arrangement allows several of the drive sprocket teeth to engage the track during operation thus distributing the forces over several sprocket teeth instead of concentrating the drive forces on a single tooth.

In addition to increased flexibility, the disclosed arrangement also permits a cushioned drive of the track. This results from the shock of the sprocket teeth engaging the cross bars 14 being absorbed by the fabric layer 40 which envelopes the cross bar and the resilient rubber material forming the base material. The only two metallic components in the entire belt construction, that is, the cross bars 14 and the wire rope 44, are separated from each other so that the wire rope 44 cannot serve to transmit the shock of the sprocket drive.

The bias-cut of the fabric layers 40, 42 provides a construction which gives the track the ability to envelope sharp objects such as stones or the like without puncture. Heretofore, a conventional square woven fabric which may have been employed in tracks of this type would be adversely affected by such sharp objects which would attend to spread the warp threads and pierce the track. The double layers 40, 42 of oppositely directed bias-cut fabric effectively prevents such an occurrence in the disclosed belt.

Another desirable attribute of the track is the lack of any need for a cotton fabric in the track. As pointed out hereinabove, nylon is desirable since it does avoid absorption of water but, in view of its tendency to stretch under tension, nylon has been unsatisfactory as the means for resisting the tension applied to the belt. The prior art traditionally has employed a combination of nylon and cotton in which cotton threads extended longitudinally of the belt and were designed to resist the tensile forces while the nylon threads ran laterally of the belt. However, the presence of the cotton, which has a high rate of water absorption, in a belt of this type presented problems in that the cotton threads would absorb the water. In addition to increasing the weight of the belt, the water in the cotton fabric would freeze under cold conditions and the belt would become extremely stiff and inflexible. The combination of the bias-cut fabric and the embedded wire rope cables has overcome all of these problems and contributed to a belt which is extremely flexible in all weather conditions while yet retaining the desirable lateral and longitudinal stability.

Changes and modifications in the described preferred embodiment will suggest themselves to those having ordinary skill in the art. Changes and modifications such as these are intended to be within the scope of the invention as defined by the appended claims.

Having thus described my invention, I claim:

1. A construction for an endless belt or track comprising a plurality of elongated strips of flexible material having a generally flat surface on at least one side thereof,
   relatively rigid cross bar means extending transverse of said strips,
   said cross bar means being embedded in said strips with said strips being interconnected only by said cross bear means whereby said cross bar means and strips cooperate to define apertures through said belt,
   at least one layer of fabric means embedded in said strips and extending longitudinally thereof,
   said one layer of fabric means being in engagement with and enclosing a major portion of the periphery of said cross bar means whereby said fabric means and said cross bar means are in a force transmitting relationship, and
   cable means embedded in said strip and extending longitudinally of said strip,
   said cable means being separate from and unconnected with said cross bar means.

2. The construction of claim 1 wherein said fabric means comprises a layer of fabric lying in a plane generally spaced from the longitudinal axis of said cross bar means.

3. The construction of claim 1 and further including a second layer of fabric extending longitudinally of said strip,
   one of said layers being bias-cut in one direction whereby the warp threads comprising said fabric extend in a direction at an angle to the longitudinal axis of said construction and the other of said layers being bias-cut in the opposite direction whereby the warp threads comprising said fabric extend in a direction at an angle to the longitudinal axis of said construction and at an angle to the warp threads of said first layer.

4. The construction of claim 1 wherein said cable means comprise wire rope with a portion of said wire rope being of a left hand twist and the remaining portion of said wire rope being of a right hand twist.

5. The construction of claim 1 wherein said fabric means is composed solely of a material having a low rate of moisture absorption.

6. The construction of claim 1 and including a second layer of fabric embedded in said belt and spaced from said first layer.

7. The construction of claim 6 wherein said cable means are positioned between said layers of longitudinal fabric means.

References Cited

UNITED STATES PATENTS

| | | | |
|---|---|---|---|
| 2,449,421 | 9/1948 | Slemmons | 305—38 |
| 2,461,849 | 2/1949 | Slemmons | 305—38 |
| 2,476,828 | 7/1949 | Skromme | 305—38 |
| 2,899,242 | 8/1959 | Bombardier | 305—38 |
| 3,210,133 | 10/1965 | Swanson | 305—35 |
| 3,285,677 | 11/1966 | Narier | 305—38 |
| 3,416,845 | 12/1968 | Scanland | 305—38 |
| 3,436,128 | 4/1969 | Boulanger | 305—38 |

RICHARD J. JOHNSON, Primary Examiner